June 12, 1956
C. E. ANDERSON
2,749,809
METAL REMOVING APPARATUS FOR TRIMMING TUBE ENDS
Filed Nov. 7, 1952
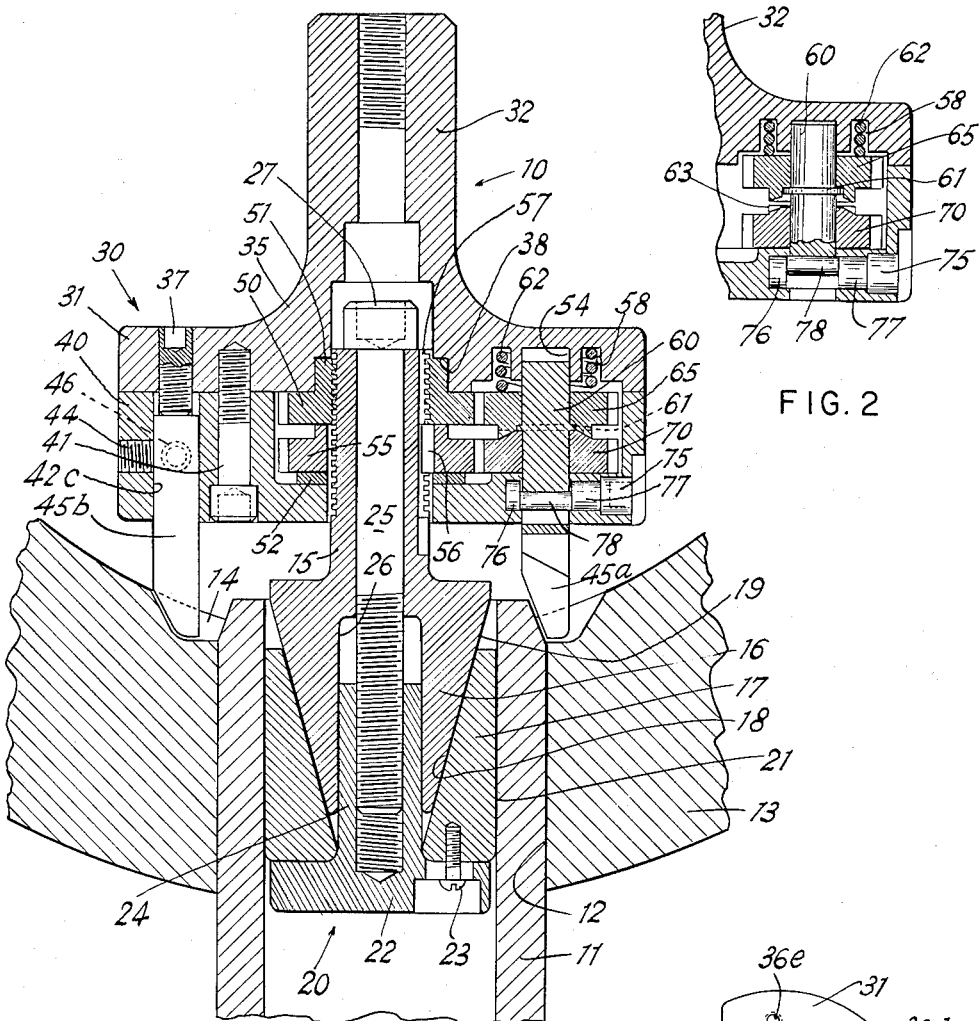
FIG. 1
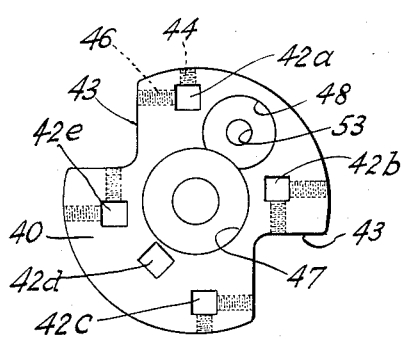
FIG. 3
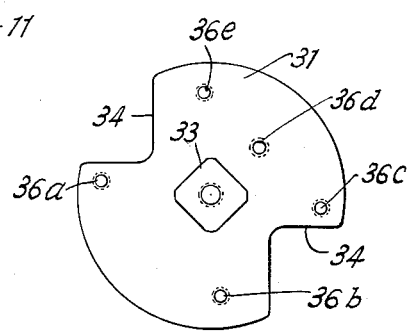
FIG. 2
FIG. 4
INVENTOR
Clarence E. Anderson
BY
JP Moran
ATTORNEY

United States Patent Office 2,749,809
Patented June 12, 1956

2,749,809

METAL REMOVING APPARATUS FOR TRIMMING TUBE ENDS

Clarence E. Anderson, Wadsworth, Ohio, assignor to The Babcock & Wilcox Company, New York, N. Y., a corporation of New Jersey Application November 7, 1952, Serial No. 319,367

6 Claims. (Cl. 90—12)

This invention relates to metal removing apparatus for trimming tube ends and, more particularly, to a compact device of small bulk particularly designed for metal cutting operations on or adjacent the ends of tubes connected into a header or other relatively small diameter pressure vessels.

In the fabrication of tubular head exchange apparatus involving connection of tubes into headers, drums, and the like, the tubes are secured into the headers by being inserted through tube seats formed in the header walls, after which the thus inserted tube ends are expanded into pressure-tight engagement with the tube seats. This forms a pressure-tight joint between the tube end and the header wall, but such joint may not necessarily be leakproof under operating conditions. While the tube expanding operation could be carried out to an extent sufficient to provide a leak-proof joint, this would involve future problems resulting from expansion and contraction of the tube and header under operating temperatures and pressures.

For this reason, it is frequent practice to seal the joint between the tube end and the header wall by a seal weld. When it is necessary or desirable to remove a tube from the header, it is necessary to remove this seal weld, and this presents practical complications in the case of relatively small diameter headers where is it difficult to find sufficient freedom of movement for chipping out or grinding away the seal weld.

The foregoing is a typical problem encountered when working on tubes connected to small diameter headers. However, other problems may arise in practice. For example, in initially assembling the tube to the header and expanding the tube end against the tube seat, the tube end may unduly project beyond the inner surface of the header, which is undesirable in certain installations. It then becomes necessary to trim the tube end to be substantially flush with the internal surface of the header.

Also, in making the seal weld, it is frequently desirable to have the same recessed into the inner surface of the header and the outer periphery of the tube end. This requires cutting away of metal from the tube end and the header inner surface around the periphery of the tube end, after which the groove thus formed is filled with a seal weld deposit.

The present invention is directed to tube end trimming apparatus particularly designed for use where limited space is available for mounting and operation of the apparatus. To this end, the invention apparatus includes a relatively short, tubular externally threaded shaft, having operatively associated therewith clamping means arranged to grip the inner surface of a tube adjacent its end and support the shaft in projecting coaxial relation to the tube. The clamping means is desirably operable by a clamp adjusting screw telescoped through the tubular shaft.

The threaded shaft rotatably supports a tool carrier which is axially movable of the threaded shaft. This carrier includes a disk-like portion for interchangeably supporting metal cutting tools at various distances from the axis of the shaft, the tools extending parallel to the shaft toward the tube end. The carrier has a projecting tubular hub coaxial with the threaded shaft, for insertion of an operating means to adjust the screw for operating the clamping means, and the hub has a polygonal exterior surface for reception of suitable driving means for rotating the carrier.

A feed nut gear is mounted in the carrier and threaded on the shaft, being held against movement axially of the carrier. Also supported in the carrier is a dual speed differential gearing operable, upon rotation of the carrier, to rotate the feed nut relative to the shaft at either one of two speeds, one of which is a slow tool feeding speed and the other of which is a relatively higher carrier positioning speed. Speed selector means are operatively associated with the differential gearing for conditioning the latter for either one of the two operating speeds of the feed nut gear.

The carrier is arranged to support metal cutting tools in alignment with the ends of the tube for trimming the latter, and also has provision for supporting other metal cutting tools in position to form a groove between the inner surface of a header and the periphery of the tube end. Such latter tools are also properly positioned for cutting out a seal weld.

For an understanding of the invention principles, reference is made to the following description of a typical embodiment thereof as illustrated in the accompanying drawing. In the drawing:

Fig. 1 is an axial sectional view through metal removing apparatus in accordance with the present invention, illustrating the same as mounted for operating on the end of a tube inserted in a tube seat in a header;

Fig. 2 is a sectional view of a portion of Fig. 1, illustrating a feed speed controlling clutch in a disengaged condition;

Fig. 3 is a bottom plan view of the tool carrier; and

Fig. 4 is a top plan view of the carrier.

Referring to the drawing, the metal removing apparatus 10 of the invention is illustrated as mounted in position for operating on the inner end of a tube 11 preferably expanded into a tube seat 12 of a relatively thick walled header or pressure vessel 13. In the particular arrangement illustrated, the tools of apparatus 10 are shown as positioned to form a groove 14 in the inner surface of header 13 and as operating to bevel the inner end of tube 11.

The apparatus includes a tubular shaft 15 which is externally threaded and has a conical enlargement 16 on one end. A split ring wedge 17 forms part of the clamping means and is illustrated as having an inner conical surface 18 engaged with the conical surface 19 of enlargement 16. Split ring 18 has a substantially cylindrical external surface 21 arranged to be expanded against the inner surface of tube 11 by relative axial movement of the two parts 16 and 17 of the clamping means 20. Such clamping means further includes circular plate 22 secured by screws 23 to the thicker end of ring 17 and having an internally threaded tubular stem 24 extending into an elongated cylindrical recess 26 in enlargement 16. A bolt 25 is threaded into stem 24 and has a socket head 27 engaged with the outer end of shaft 15.

By operation of bolt 25 the elements 16, 17 of clamping means 20 are given relative axial movement to engage or disengage the clamping means relative to the interior surface of tube 11. The arrangement of parts is such that shaft 15, when part 17 of clamping means 20 is expanded against the inner surface of tube 11 by relative axial movement of part 16, is coaxial with tube 11 and projects outwardly therefrom.

Rotatably mounted on shaft 15 is a tool carrier generally indicated at 30. This carrier comprises a housing and drive member 35 including a generally circular flange portion 31 from which coaxially projects a tubular stem 32. Stem 32 has a polygonal periphery 33 for receiving a suitable drive means, such as the chuck of an air motor or the like, and is coaxial with shaft 15. Thereby, a screw driver or the like may be inserted through hub 32 to engage in the head 27 of screw 25 for adjustment of the clamping means 20.

Carrier 30 includes a second housing member 40 secured to member 35 by socket headed studs 41 extending through member 40 and threaded into member 35. Member 40 has formed therethrough, at varying distances from its axis, polygonal passages such as 42a, 42b, 42c, 42d and 42e which receive the cutting tools indicated, for example, at 45a and 45b. The housing member 40 has peripheral cut-out portions such as 43 each disposed between a pair of tool receiving recesses. The tools are held in position by set screws in threaded recesses 44 and 46 associated with four of the recesses 42. Set screw recesses 44 extend inwardly from the periphery of member 40, whereas set screw recesses 46 are at right angles to recesses 44 and extend inwardly from walls of cut-outs 43. Thus, a pair of perpendicularly related set screws are provided for holding each tool in its receiving recess.

The drive member 35 is formed with cut-out portions 34 corresponding to the ports 43 of member 40, and with threaded recesses 36a through 36e each aligned with one of the recesses 42 in member 35. Each recess 36 receives a socket headed set screw 37 arranged to engage the end of a tool 45 to adjust the same longitudinally of its seating recess.

It should be noted that tool socket 42d does not have laterally extending set screw recesses associated therewith. This socket, which is considerably closer to the axis of member 40 than are the other tool sockets, is designed to receive a tool for trimming the end surface of tube 11, and this tool is held in position solely by a set screw in socket 36d.

Drive member 35 is formed with a central recess 38 in its undersurface cooperating with a central recess 47 in the upper surface of member 40 to provide, in combination with an eccentric circular recess 48 in member 40, a differential gearing housing. A feed nut gear 50 is threaded on shaft 15 and has a hub 51 set in recess 38. Immediately adjacent gear 50 is a drive gear 55 which is axially movable of shaft 15 but held against rotation thereon by a key 56 engaged in a keyway 57 extending along shaft 15. A thrust washer 52 is disposed between gear 55 and a wall of housing member 40. Gears 50 and 55 are equal in diameter and have the same number of teeth, for example 36 teeth in a particular application.

A shaft 60 is inserted through a central opening 53 in the recess 48 of member 40, and its inner end has a bearing engagement in a recess 54 in drive member 35. Surrounding recess 54 is an annular spring seating recess 58 for a purpose to be described.

The recess 48 receives a clutch forming part of the differential gearing, this clutch comprising a pair of clutch gears 65 and 70 rotatably mounted on shaft 60. The latter has an annular shoulder 61 midway of its length which sets in a suitable axial recess in one face of gear 65. The other face of gear 65 is engaged by a compression spring 62 seated in the recess 58. The facing or normally contacting surfaces of the clutch gear are formed with radially extending sawtoothed teeth, such as 63.

The two gears 65 and 70 are of the same diameter but have differing numbers of teeth depending upon the feeding speed desired. For example, gear 65 may have 23 teeth and gear 70, 24 teeth; gear 65, 22 teeth and gear 70, 24 teeth; or gear 62, 22 teeth and gear 70, 25 teeth. The only requirement is that the number of teeth on the two gears 65 and 70 differ by a small number, such as one, two or three.

Gear 65 is maintained in engagement with gear 70 by the spring 62. To disengage the clutch, an operating shaft 75 is provided. This shaft has cylindrical bearing portions 76 and 77 seating in cylindrical portions of a radial recess intersecting the axis of recess 48. Shaft 75 has a socket operating head, and intermediate its ends has a cam portion 78 of elliptical cross-section and having a thickness substantially one half the diameter of the bearing portion of shaft 75.

In the position of shaft 75 shown in Fig. 1, the cam surface 78 is downward so that spring 62 forces gear 65 against gear 70. To disengage the clutch, shaft 75 is given a half turn to the position shown in Fig. 2 so that cam portion 78 moves shaft 60 upwardly. Collar 61 engaging the undersurface of gear 65 lifts this gear out of engagement with gear 70. As will be described, this conditions the differential gearing for relatively high speed rotation of feed nut gear 50.

With clamping means 16 and 17 extended relatively to each other, these clamping means are inserted into the end of tube 11. A screw driver is then inserted through stem 32 into the socket head of screw 25, and the latter is turned to force conical enlargement 16 outwardly along ring 17. This expands the clamping means against the inner surface of tube 11. Previous to this, the proper tools for the particular metal removing operation to take place will have been inserted in the tool sockets 42 and the several set screws suitably adjusted.

Carrier 30 is then rotated by power means applied to the polygonal contoured stem 32. As carrier 30 is rotated, the clutch gears 65, 70 revolve around the nut gear 50 and drive gear 55. Due to the difference in the numbers of teeth on the two clutch gears, rotation of gear 50 relative to gear 56 is effected, the amount of such rotation during each revolution of the carrier 30 being dependent upon the number of teeth difference between gears 65 and 70 as related to the number of teeth on the gears 50 and 55. Nut gear 50 is thus threaded along shaft 15 to engage the tools with the work and effect a cut in the work.

When a rapid travel of nut 50 is desired, as in initially positioning the tools 45 or in retracting the tools, selector shaft 75 is turned to the position shown in Fig. 4. This disengages gear 65 from gear 70, and rotation of gear 65 on shaft 61 is frictionally inhibited by the spring 62. When carrier 30 is now rotated, the engagement between the substantially non-rotatable gear 65 and nut gear 50 causes the latter to be relatively rapidly threaded inwardly or outwardly along shaft 15. Such gear selection is readily effected by inserting a suitable wrench into the socket head of selector shaft 75.

It will be noted, from the drawing and from the foregoing description, that a compact tube end conditioning apparatus has been provided which is simply and easily mounted in position in the end of the tube to be trimmed. This apparatus may be easily and readily adjusted for either slow or fast feeding of tools, and requires only a minimum amount of space so that it is readily adaptable for use in cramped locations, such as within a small diameter header.

While a specific embodiment of the invention has been shown and described in detail to illustrate the application of the invention principles, it will be understood that the invention may be embodied otherwise without departing from such principles.

What is claimed is:

1. Metal removing apparatus for trimming tube ends comprising, in combination, a threaded shaft; clamping means operatively associated with said shaft and arranged to frictionally engage the inner surface of the tube and support said shaft in substantially axial alignment with the tube and projecting from the tube end; a tool carrier rotatably mounted on said shaft and movably axially thereof, and constructed and arranged to be rotated by driving means; metal cutting tools mounted in said carrier; a feed nut gear fixed axially of said carrier and threaded on said shaft; a dual speed differential gearing operatively interposed between said nut gear and said carrier and including a driving gear fixed axially of said carrier and movable axially of said shaft; a pair of clutch gears rotatable in said carrier on an axis eccentric to said shaft and each engaged with one of said first-named gears; the number of teeth on said clutch gears differing by one; means normally biasing said clutch gears into engagement for slow speed rotation of said feed nut gear upon rotation of said carrier; and means selectively operable to disengage said clutch gears for high speed rotation of said feed nut gear upon rotation of said carrier.

2. Metal removing apparatus for trimming tube ends comprising, in combination, a threaded shaft; clamping means operatively associated with said shaft and arranged to frictionally engage the inner surface of the tube and support said shaft in substantially axial alignment with the tube and projecting from the tube end; a tool carrier rotatably mounted on said shaft and movable axially thereof, and constructed and arranged to be rotated by driving means; metal cutting tools mounted in said carrier; a feed nut gear fixed axially of said carrier and threaded on said shaft; a dual speed differential gearing operatively interposed between said nut gear and said carrier and including a normally engaged clutch operative, when engaged, to effect slow speed rotation of said feed nut gear upon rotation of said carrier; and means selectively operable to disengage said clutch for high speed rotation of said feed nut gear upon rotation of said carrier.

3. Metal removing apparatus for trimming tube ends comprising, in combination, a threaded shaft; clamping means operatively associated with shaft and arranged to frictionally engage the inner surface of the tube and support said shaft in substantially axial alignment with the tube and projecting from the tube end; a tool carrier rotatably mounted on said shaft and movable axially thereof, and constructed and arranged to be rotated by driving means; metal cutting tools mounted in said carrier; a feed nut gear fixed axially of said carrier and threaded on said shaft; a dual speed differential gearing operatively interposed between said nut gear and said carrier and including a driving gear fixed axially of said carrier and movable axially of said shaft; a pair of clutch coaxial gears rotatable in said carrier on an axis eccentric to said shaft and each engaged with one of said first-named gears; the number of teeth on said clutch gears differing by one; means normally biasing said clutch gears into engagement for slow speed rotation of said feed nut gear upon rotation of said carrier; and means selectively operable to disengage said clutch gears for high speed rotation of said feed nut gear upon rotation of said carrier.

4. Metal removing apparatus for trimming tube ends comprising, in combination, a threaded shaft; clamping means operatively associated with said shaft and arranged to frictionally engage the inner surface of the tube and support said shaft in substantially axial alignment with the tube and projecting from the tube end; a tool carrier rotatably mounted on said shaft and movable axially thereof, and constructed and arranged to be rotated by driving means; metal cutting tools mounted in said carrier; a feed nut gear fixed axially of said carrier and threaded on said shaft; a dual speed differential gearing operatively interposed between said nut gear and said carrier and including a driving gear fixed axially of said carrier and movable axially of said shaft; a pair of clutch gears rotatable in said carrier on an axis eccentric to said shaft and each engaged with one of said first-named gears; the number of teeth on said clutch gears differing by one; spring means engaged with said carrier and one of said clutch gears and normally biasing said clutch gears into engagement for slow speed rotation of said feed nut gear upon rotation of said carrier; and means selectively operable to disengage said clutch gears for high speed rotation of said feed nut gear upon rotation of said carrier.

5. Metal removing apparatus for trimming tube ends comprising, in combination, a threaded shaft; clamping means operatively asociated with said shaft and arranged to frictionally engage the inner surface of the tube and support said shaft in substantially axial alignment with the tube and projecting from the tube end; a tool carrier rotatably mounted on said shaft and movable axially thereof, and constructed and arranged to be rotated by driving means; metal cutting tools mounted in said carrier; a feed nut gear fixed axially of said carrier and threaded on said shaft; a dual speed differential gearing operatively interposed between said nut gear and said carrier and including a driving gear fixed axially of said carrier and movable axially of said shaft; a pair of clutch coaxial gears rotatable in said carrier on an axle eccentric to said shaft and each engaged with one of said first named gears; the number of teeth on said clutch gears differing by one; spring means engaged with said carrier and one of said clutch gears and normally biasing said clutch gears into engagement for slow speed rotation of said feed nut gear upon rotation of said carrier; said axle having a collar engaging the surface of said one clutch gear opposite that engaged by said spring means; and selector means operable to move said axle toward said spring means to disengage said clutch gears for high speed rotation of said feed nut gear upon rotation of said carrier.

6. Metal removing apparatus for trimming tube ends comprising, in combination, a tubular, externally threaded shaft having a conical enlargement on one end; an expansible wedge having an inner conical surface engageable with said enlargement and an outer cylindrical surface expansible against the inner surface of a tube by relative axial movement of said wedge and enlargement to support said shaft in coaxial projecting relation to the tube end; a wedge operating screw telescoped in said shaft and threaded into said wedge; a tool carrier rotatably mounted on said shaft and movable axially thereof, and constructed and arranged to be rotated by driving means; a feed nut gear fixed axially of said carrier and threaded on said shaft; a dual speed differential gearing operatively interposed between said nut gear and said carrier and including a normally engaged clutch operative, when engaged, to effect slow speed rotation of said feed nut gear upon rotation of said carrier; and means selectively operable to disengage said clutch for high speed rotation of said feed nut gear upon rotation of said carrier.

References Cited in the file of this patent

UNITED STATES PATENTS

| 349,963 | Watson et al. | Sept. 28, 1886 |
| 1,967,454 | Storm et al. | July 24, 1934 |
| 1,972,022 | Le May | Aug. 28, 1934 |
| 2,289,631 | Cuda et al. | July 14, 1942 |
| 2,627,193 | Statia | Feb. 3, 1953 |